United States Patent [19]

Allan et al.

[11] 4,374,230

[45] Feb. 15, 1983

[54] STABILIZED POLYOLEFIN COMPOSITIONS

[75] Inventors: John L. H. Allan, Glen Rock; Arnold B. Finestone, Woodcliff Lake, both of N.J.; John J. Roderick, Avon Lake, Ohio

[73] Assignee: El Paso Polyolefins Company, Paramus, N.J.

[21] Appl. No.: 24,499

[22] Filed: Mar. 28, 1979

Related U.S. Application Data

[62] Division of Ser. No. 705,303, Jul. 14, 1976, abandoned.

[51] Int. Cl.³ ............................................. C08L 23/00
[52] U.S. Cl. ................................... 525/134; 525/145; 525/154; 525/185
[58] Field of Search ................ 260/45.95 G; 528/125, 528/150, 165; 525/136, 145, 185, 154, 134

[56] References Cited

U.S. PATENT DOCUMENTS

| | | | |
|---|---|---|---|
| 2,647,102 | 7/1953 | Ambelang | 528/165 |
| 2,732,368 | 1/1956 | Shepard | 528/165 |
| 2,888,364 | 5/1959 | Bauer | 260/45.95 G |
| 3,438,935 | 4/1969 | Leu | 260/45.85 S |
| 3,752,865 | 8/1973 | Scardiglia et al. | 428/379 X |
| 3,772,245 | 11/1973 | Dexter | 260/45.85 N |
| 3,792,014 | 2/1974 | Ihrman et al. | 260/45.85 B |
| 3,856,728 | 12/1974 | Abramoff | 260/45.95 G |

FOREIGN PATENT DOCUMENTS 49-67444 12/1975 Japan ............................ 260/45.95 G

*Primary Examiner*—John Kight, III
*Assistant Examiner*—Amelia B. Yarbrough
*Attorney, Agent, or Firm*—Fred S. Valles; Margareta LeMaire

[57] ABSTRACT

Polyolefin resins are rendered stable against degradation caused by exposure to heat and oxygen in the presence of copper by the incorporation of a novel polymeric stabilizer functioning dually as an antioxidant and a chelating agent.

19 Claims, No Drawings

STABILIZED POLYOLEFIN COMPOSITIONS

This is a division of application Ser. No. 705,303, filed July 14, 1976, now abandoned.

BACKGROUND OF THE INVENTION

This invention relates to polyolefin compositions having stability against degradation caused by exposure to heat and oxygen, especially in the presence of copper.

It is well known in the art to stabilize polymers against degradation due to heat and oxidation by incorporating into the polymers a stabilizing amount of hindered phenolic antioxidants, e.g. those disclosed in U.S. Pat. Nos. 2,968,644 and 3,285,855. However a serious disadvantage to the use of plastic materials, such as polyolefin resins, as insulation for wire and cables is the fact that the degradation of the polymer is accelerated by the presence of copper and alloys of copper. Prior art methods to solve this problem have resulted in a combination of the polyolefin resins with the primary hindered phenolic antioxidant and a copper deactivator or chelating agent such as certain organic hydrazide or hydrazine compounds, e.g. those disclosed in U.S. Pat. Nos. 3,438,935; 3,484,285; 3,752,465; and 3,772,245.

THE INVENTION

In contrast to the prior art compositions, the present invention is directed to stabilized polyolefin compositions containing a dual function stabilizer, i.e. one that acts both as a primary antioxidant and as a chelating agent.

The composition of this invention comprises a polyolefin resin and a polymeric compound containing repeating groups having the formula:

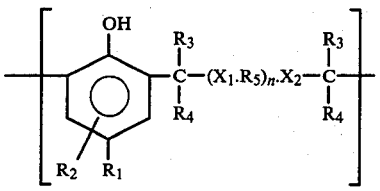

wherein
$R_1$ can be an alkyl, cycloalkyl, alkaryl or an aryl group of 3 to 30 carbon atoms,
$R_2$ is hydrogen or a sulfonic acid salt group,
$R_3$ and $R_4$ each is hydrogen or an alkyl, cycloalkyl, alkaryl or an aryl group of 1 to 36 carbon atoms,
$R_5$ is an alkylene, cycloalkylene, alkarylene or an arylene group of 2 to 20 carbon atoms,
each $X_1$ and $X_2$, independently from each other, is —O—, —S—, or —$NR_6$ in which $R_6$ is hydrogen or an alkyl, cycloalkyl, alkaryl or an aryl group of 1 to 36 carbon atoms,
and n is zero or an integer.

The amount of the polymeric compound ranges from about 0.1 to about 10 percent by weight of the composition.

The polymeric stabilizer is suitably prepared by first reacting at least one para-substituted phenol, i.e. a phenol having a group $R_1$ as defined above located in the para position with respect to the hydroxyl group, with an aldehyde or a ketone in the presence of an alkaline catalyst, such as an oxide or hydroxide of an alkali or alkaline earth metal, ammonia or an amine. In addition to the requirement of para substitution, the phenol may also contain a sulfonic acid salt group or a sulfonic acid group —$SO_3H$, which becomes neutralized by a portion of the alkaline catalyst to the corresponding salt during the reaction. Also a mixture of different para substituted phenols fitting the aforementioned general requirements may be used. The molar ratio of aldehyde or ketone to the substituted phenol should be at least 2:1. Examples of suitable aldehydes and ketones useful in the preparation include formaldehyde, acetaldehyde, propionylaldehyde, butyraldehyde, benzaldehyde, tolualdehydes, furfuraldehyde, acetone, methyl ethyl ketone, methyl propyl ketone, diethyl ketone, etc. In this initial reaction, which can be carried out at moderate conditions, e.g. at ambient pressure and at temperatures in the range of about 80° to about 130° C., the reaction product is a dialcohol.

The method of carrying out the second step which is a condensation reaction, depends upon the desired chemical composition of the final product. Thus, when an ether linked condensation product is desired, no further reactants are added, and the dialcohol intermediate is caused to condense by adjusting the pH to a value which is neutral or slightly acidic. This is carried out by neutralization with an acid in case of non-volatile catalyst, or merely distilling off the catalyst in case of volatile catalysts such as ammonia or organic amines. The reaction is carried out at temperatures from about 50° to about 200° C. while removing water from the system including water formed in the condensation reaction. Also, any unreacted material is also removed. Preferably, at the end of the last stage the temperature is increased and the pressure is reduced to degas the product and to remove any residual water. Poly ether linked condensation products are obtained by adding a suitable reactant such as a glycol, e.g. ethylene glycol, propylene glycol, polyethylene glycol, etc. to the second step reaction in a mol ratio of 1:1 based on the moles of phenol used in preparing the dialcohol.

In the preparation of a final polymer product containing nitrogen atoms in the linkage, a reactant such as ammonia, a monoamine of the formula $R_6NH_2$ or a polyamine of the formula $H(NR_6.R_5)_nNR_6H$, is added to the dialcohol intermediate product in a molar ratio of about 1:1 based on the moles of phenol used in preparing the dialcohol. The reaction can be carried out at relatively moderate operating conditions, e.g. at ambient pressure and temperatures up to 150° C. Water is removed from the system at least during the latter part of the reaction and the product is advantageously degassed and further dewatered at somewhat higher temperatures and under vacuum. When ammonia or a monoamine is used as the linking reactant, obviously only one nitrogen atom is present in the linkage, and the value of "n" in the general formula is zero. In the case of a polyamine, e.g. dialkylene triamine, trialkylene tetramine, etc., "n" will be an integer.

Polymer products containing sulfur atoms in the linkage are prepared essentially in the same manner as that employed to produce the aforementioned nitrogen linked polymers, except that the dialcohol intermediate is reacted with either hydrogen sulfide or a polysulfide represented by the formula $H[S.R_5]_nSH$, e.g. ethane-1,2-dithiol, hexane-1,6-dithiol, etc.

In an analogous fashion polymer products are prepared containing mixed groups denoted by $X_1$ and $X_2$ in the general formula. Suitable starting materials for reaction with the dialcohol intermediate include ethanol amine, 2 2'-diaminodiethyl ether, 2,2'-dihydroxydiethyl sulfide, 2-mercapto ethanol and the like.

The polyolefin resin component of the composition of this invention comprises solid, substantially crystalline polyolefins including homopolymers and copolymers of mono-α-olefins having 2 to 8 carbon atoms and blends thereof. Among the preferred polyolefins are the polypropylene based resins containing at least 60 percent by weight, preferably at least 75 percent polymerized propylene groups. Especially preferred resins are the ethylene-propylene polymer resins, such as random or block copolymers of ethylene and propylene, blends of homopolymers of propylene and ethylene, and various combinations thereof, wherein the ethylene in either homo- or copolymerized state accounts for from about 2 to about 25 percent by weight of the total resin and more preferably from about 3 to about 15 percent.

The polymeric stabilizer should be incorporated into the polyolefin resin in amounts from about 0.1 to about 10 percent by weight of the composition, and preferably in concentrations from about 0.5 to about 5 percent by weight. Since the stabilizer functions both as a chelating agent and an antioxidant there is no need to add any other such stabilizers to the polyolefin composition. However, it should be understood that the scope of the present invention does not preclude the use of one or more of such auxilliary stabilizers in combination with the stabilizer of this invention, if so desired.

In addition, the compositions of this invention can also contain other optical ingredients such as ultraviolet stabilizers, pigments, delustrants, plasticizers, flame retardant materials, antistatic agents, processing aids, and any other additive which is known in the art to impart a particular property to the composition for a particular application.

The polymeric stabilizer is especially suited for use in wire and cable insulation applications, where resistance to copper degradation is of utmost importance. In addition, the polymeric stabilizers are generally quite resistant to extraction by high viscosity liquids such as petrolatum or petroleum jelly, which is an underground cable fill the void spaces between the outer cable plastic tubing and the individual plastic insulated wires. The extraction resistance is particularly good when at least a portion of the phenolic rings in the polymer chain contain a sulfonic acid salt group.

The following examples illustrate the invention but are not intended to limit its scope. Unless otherwise indicated all parts and percentages are based on weights.

EXAMPLE 1

An ether linked polymeric stabilizer was prepared as follows. Para-n-nonyl phenol (107.5 g.; 0.5 mole), formalin solution (89.0 g. containing 37.4% formaldehyde; 1.1 mole), and triethyl amine (3.03 g.; 0.03 mole) were stirred and heated under reflux at 90°–103° C. for 13 hours under nitrogen atmosphere. A yellowish-white viscous dialcohol product was obtained which showed no further change in viscosity on heating. The triethyl amine catalyst was then removed by distillation by gradually heating the mixture to 110° C. for 7 hours. Also, water present and formed during the condensation reaction, and unreacted material was also removed during this second stage reaction period. Degassing and the removal of residual water was accomplished by heating to 130° C. under vacuum (2.5 torr). The resulting ether linked polymer solidified on cooling and was ground into a powder, having a pale yellow color.

EXAMPLE 2

A polyamine condensate was prepared by first forming the dialcohol from a mixture of para-t-octyl phenol (103 g.; 0.5 mole), formaline solution (81.5 g. of 37.4% conentration; 1.0 mole), and triethyl amine (3.03 g.; 0.03 mole), which was refluxed for 11 hours under agitation and a nitrogen blanket for 11 hours at 96°–100° C., until no further change in viscosity was noted. Thereafter the water was removed by distillation at atmospheric pressure. For the second condensation step the dialcohol was cooled to 74° C. and ethylene diamine (30.5 g.; 0.5 mole) was added and the mixture refluxed at 98°–105° C. for 70 minutes when no further change in viscosity was noted. The mixture was finally dehydrated under a vacuum of 0.5 torr while gradually raising the temperature to 180° C. Upon cooling a yellowish-white solid was obtained which was ground to a powder.

EXAMPLE 3

A polysulfide condensate was prepared by first forming the dialcohol as in Example 1 except that 1.0 mole of formaldehyde was used instead of 1.1 mole and the reaction was carried out for 8 hours. In the condensation step ethane-1,2-dithiol (42.4 g.; 0.45 mole) was added to the reaction mixture, which had been cooled previously to 70° C. Water was then distilled off with the temperature rising to 148° C. during 13 hours. Residual water and other volatiles were then removed at 148° C. under a vacuum of 2.5 torr. The cooled product was ground to a powder.

EXAMPLE 4

To demonstrate the chelating effectiveness of the polymeric stabilizers of this invention a series of blends were made by compounding in a Brabender at 190° C. for 5 minutes an ethylene-propylene copolymer (11.3 wt. % ethylene units) with the various stabilizers and in the proportions shown in Table 1.

Thus, comparative Blend A contained 98 parts copolymer and 2 parts of t-butyl, t-octyl phenol acetaldehyde novolac resin, which is commercially available and known to be effective as a primary antioxidant in this concentration. Blends B, C and D each contained 97 parts of the copolymer, 2 parts of the primary antioxidant used in Blend A. The remaining part of each blend was respectively the product of Example 1, Example 2, and Example 3.

Each of the blended samples A–D was then compression molded into 6"×6"×10 mil. plaques at 400° F., and 25,000 p.s.i.g. for 60 seconds. The plaques were rapidly cooled at high pressure, 1½"×1½"×10 mil. strips cut from the plaques, and tested using differential scanning calorimetry (DSC). This analysis provides an extremely effective method for obtaining accelerated aging data which can be extrapolated to periods of decades at ambient temperatures. The DSC test procedure is as follows.

A small sample of the 10 mil. film strip prepared in the compression mold having a diameter of approximately 0.25" is placed on a copper test pan in a differential scanning calorimeter (DSC). The pan is then covered and heated from room temperature at a linear programmed rate of 10° C./min. in the presence of nitrogen flowing through the DSC at a rate of 0.08 cu. ft. per hour. When the temperature in the DSC reaches 200° C., the nitrogen is automatically stopped and oxygen flowing at the same rate is passed through the DSC. The temperature is maintained at 200° C. until the oxidation peak has occurred and the induction period is measured in minutes from the time the oxygen is added until the oxidative degradation occurs.

Table 1 below shows the result of the testing.

TABLE 1

| Run | Copolymer Base Resin | Primary Antioxidant | Chelating Agent Ex. 1 | Chelating Agent Ex. 2 | Chelating Agent Ex. 3 | DSC Stability Min. |
|---|---|---|---|---|---|---|
| A | 98 | 2 | — | — | — | <3 |
| B | 97 | 2 | 1 | — | — | 65 |
| C | 97 | 2 | — | 1 | — | 40 |
| D | 97 | 2 | — | — | 1 | 73 |

As seen from the above data, in the absence of a chelating agent, the copolymer resin stabilized with the primary antioxidant degrades rapidly in the presence of copper, while the blends containing the polymeric stabilizers of this invention all exhibited good stabilities, thereby demonstrating that these stabilizers are effective chelating agents.

EXAMPLE 5

This example demonstrates the usefulness of the polymeric stabilizers of this invention as a primary antioxidant. Again, four blends were made with the copolymer of Example 4 and the various stabilizers shown in Table 2.

Blend E contained 99 parts of the copolymer and 1 part of N-salicylidene-N'-salicyl hydrazide, a well known chelating agent used in the stabilization of polyolefin resins in direct contact with copper and copper alloys.

Blends F, G, and H each contained 97 parts of the base resin, 1 part of the chelating agent of Blend E and respectively 2 parts of the polymeric stabilizers of Examples 1, 2 and 3. All blends were tested using the procedure of Example 4, the pertinent data being shown in Table 2.

TABLE 2

| Run | Base Resin | Primary Antioxidant Ex. 1 | Primary Antioxidant Ex. 2 | Primary Antioxidant Ex. 3 | Chelating Agent | DSC Stability Min. |
|---|---|---|---|---|---|---|
| E | 99 | — | — | — | 1 | <3 |
| F | 97 | 2 | — | — | 1 | 34 |
| G | 97 | — | 2 | — | 1 | 50 |
| H | 97 | — | — | 2 | 1 | 56 |

As shown from the test result of Run E, the chelating agent alone has no stabilizing effect on the polymer, which is, of course, what should be expected. However, when the stabilizers of this invention were also included in the composition, the stabilities were greatly enhanced, demonstrating their effectiveness as primary antioxidants.

It is obvious to those skilled in the art that many variations and modifications can be made to the compositions of this invention. All such departures from the foregoing specification are considered within the scope of this invention as defined by the specification and the appended claims.

What is claimed is:

1. A mono-α-olefin polymer composition stabilized against copper-activated accelerated oxidative degradation, which comprises:

a mono-α-olefin polymer and from about 0.1 to about 10 percent by weight based on the total weight of the composition of a polymeric compound as the sole copper deactivating agent, which polymeric compound has been prepared by a process comprising:

(a) reacting at least one para-substituted phenol of the formula:

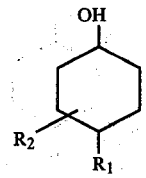

wherein
$R_1$ is a $C_3$–$C_{30}$ group selected from alkyl, cycloalkyl, alkaryl or aryl and $R_2$ is either hydrogen, a sulfonic acid group or a sulfonic acid salt group;
with an aldehyde or ketone of the formula:

wherein
$R_3$ and $R_4$ independently from each other can be either hydrogen or a $C_1$–$C_{36}$ group selected from alkyl, cycloalkyl, alkaryl or aryl,
in a molar ratio of aldehyde or ketone to phenol of at least about 2:1 in the presence of an alkaline catalyst; and (b) condensing the product of step (a) under neutral or slightly acidic conditions.

2. The composition of claim 1 wherein $R_1$ is an alkyl group.

3. The composition of claim 1 wherein $R_1$ is a tertiary alkyl group.

4. The composition of claim 1 wherein $R_3$ and $R_4$ are both hydrogen.

5. The composition of claim 1 wherein the mono-α-olefin polymer resin is selected from homopolymers and copolymers of mono-α-olefins having 2 to 8 carbon atoms, and mixtures thereof.

6. The composition of claim 1 wherein the polymeric compound is present in an amount ranging from about 0.5 to about 5 percent by weight.

7. The composition of claim 5 wherein the mono-α-olefin polymer resin is a polypropylene resin containing at least 60 percent by weight polymerized propylene groups.

8. The composition of claim 7 wherein the polypropylene resin is an ethylene-propylene copolymer resin containing from about 2 to about 25 percent by weight polymerized ethylene.

9. The composition of claim 8 wherein the ethylene-propylene copolymer resin is a copolymer containing from about 3 to about 15 percent polymerized ethylene.

10. The method of imparting stability to a mono-α-olefin polymer composition against copper-activated accelerated oxidative degradation, comprising:

incorporating into a mono-α-olefin polymer resin from about 0.1 to about 10 percent by weight based on the weight of the composition of a polymeric compound as the sole copper deactivating agent, which polymeric compound has been prepared by a process comprising:

(a) reacting at least one para-substituted phenol of the formula:

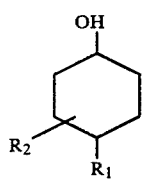

wherein
$R_1$ is a $C_3$–$C_{30}$ group selected from alkyl, cycloalkyl, alkaryl or aryl and $R_2$ is either hydrogen, a sulfonic acid group or a sulfonic acid salt group, with an aldehyde or ketone of the formula:

wherein $R_3$ and $R_4$ independently from each other can be either hydrogen or a $C_1$–$C_{36}$ group selected from alkyl, cycloalkyl, alkaryl or aryl, in a molar ratio of aldehyde or ketone to phenol of at least about 2:1 in the presence of an alkaline catalyst; and (b) condensing the product of step (a) under neutral or slightly acidic conditions.

11. The method of claim 10 wherein $R_1$ is an alkyl group.

12. The method of claim 10 wherein $R_1$ is a tertiary alkyl group.

13. The method of claim 10 wherein $R_3$ and $R_4$ are both hydrogen.

14. The method of claim 10 wherein the mono-α-olefin polymer resin is selected from homo-polymers and copolymers of mono-α-olefins having 2 to 8 carbon atoms, and mixtures thereof.

15. The method of claim 10 wherein the polymeric compound is incorporated in an amount ranging from about 0.5 to about 5 percent by weight.

16. The method of claim 14 wherein the mono-α-olefin polymer resin is a polypropylene resin containing at least 60 percent by weight polymerized propylene groups.

17. The method of claim 16 wherein the polypropylene resin is an ethylene-propylene copolymer resin containing from about 2 to about 25 percent by weight polymerized ethylene.

18. The method of claim 17 wherein the ethylene-propylene copolymer resin is a copolymer containing from about 3 to about 15 percent polymerized ethylene.

19. The stabilized composition prepared by the method of claim 10.

* * * * *

UNITED STATES PATENT AND TRADEMARK OFFICE
CERTIFICATE OF CORRECTION

PATENT NO. : 4,374,230
DATED : February 15, 1983
INVENTOR(S) : John L. H. Allan et al.

It is certified that error appears in the above-identified patent and that said Letters Patent are hereby corrected as shown below:

Front Page left hand column at line [62]:

replace "abandoned" with --Pat.No. 4,279,809--

Column 1, line 5:

replace "abandoned" with --Pat.No. 4,279,809--

Signed and Sealed this

Twenty-fourth Day of May 1983

[SEAL]

Attest:

DONALD J. QUIGG

Attesting Officer     Acting Commissioner of Patents and Trademarks